(12) United States Patent
Bigand et al.

(10) Patent No.: US 12,528,162 B2
(45) Date of Patent: Jan. 20, 2026

(54) DEVICE FOR SECURING SCREWED ASSEMBLIES AND METHOD USING THE DEVICE

(71) Applicant: THALES, Courbevoie (FR)

(72) Inventors: Jean-Louis Bigand, Vendome (FR); Tanguy Blot, Villerable (FR); Karima Bikanimine, Gennevilliers (FR)

(73) Assignee: THALES, Courbevoie (FR)

( * ) Notice: Subject to any disclaimer, the term of this patent is extended or adjusted under 35 U.S.C. 154(b) by 371 days.

(21) Appl. No.: 18/011,116

(22) PCT Filed: Jun. 30, 2021

(86) PCT No.: PCT/EP2021/068047
§ 371 (c)(1),
(2) Date: Dec. 16, 2022

(87) PCT Pub. No.: WO2022/003047
PCT Pub. Date: Jan. 6, 2022

(65) Prior Publication Data
US 2023/0241749 A1 Aug. 3, 2023

(30) Foreign Application Priority Data
Jun. 30, 2020 (FR) ...................................... 2006853

(51) Int. Cl.
*B25B 23/147* (2006.01)
*G05B 19/18* (2006.01)
*B25B 23/145* (2006.01)

(52) U.S. Cl.
CPC .......... *B25B 23/147* (2013.01); *G05B 19/186* (2013.01); *B25B 23/1456* (2013.01); *G05B 2219/49196* (2013.01)

(58) Field of Classification Search
CPC ......... B25B 17/02; B25B 19/00; B25B 21/00; B25B 21/002; B25B 21/007;
(Continued)

(56) References Cited

U.S. PATENT DOCUMENTS 4,104,780 A * 8/1978 Sigmund ................. B25B 23/14
73/761
5,105,519 A * 4/1992 Doniwa ................ B25B 23/147
173/1
(Continued)

FOREIGN PATENT DOCUMENTS

DE 102017008967 A1 * 3/2019
DE 10 2018 117 149 A1 1/2020
(Continued)

*Primary Examiner* — Robert J Scruggs
(74) *Attorney, Agent, or Firm* — BakerHostetler (57) ABSTRACT

A device for endorsing screwed assemblies, includes a screw gun intended to be handled by an operator, and computer equipment connected to the screw gun, the screw gun being equipped with measurement sensors sending information representative of the torque applied by the screw gun and an angle of rotation applied by the screw gun, the computer equipment storing, in a memory, reference data relating to a screwed assembly to be produced, the computer equipment being configured to compare information representative of the angle and the torque measured during the assembly with the reference data, and to provide a notification as to the conformity of the measurements of the angle and the torque in relation to the reference data.

10 Claims, 3 Drawing Sheets

(58) Field of Classification Search
CPC ..... B25B 21/008; B25B 23/14; B25B 23/147; B25B 23/1456; B23P 19/06; B23P 19/065; B23P 19/066; G05B 19/186; G05B 19/4183; G05B 19/41805; G05B 2219/31027; G05B 2219/31034; G05B 2219/49196; Y02P 90/02
See application file for complete search history.

(56) References Cited

U.S. PATENT DOCUMENTS

| | | | | |
|---|---|---|---|---|
| 5,131,130 | A | * | 7/1992 | Eshghy .................. B25B 23/14 73/761 |
| 5,549,169 | A | * | 8/1996 | Matsumura ............ B23P 19/06 173/176 |
| 5,637,968 | A | * | 6/1997 | Kainec ................... B25B 23/14 318/432 |
| 2011/0093110 | A1 | * | 4/2011 | Stencel .................. B25B 23/14 700/110 |

FOREIGN PATENT DOCUMENTS

| | | | |
|---|---|---|---|
| EP | 0 480 380 A2 | 4/1992 | |
| EP | 3025823 A1 * | 6/2016 | ......... B25B 23/1425 |

\* cited by examiner

DEVICE FOR SECURING SCREWED ASSEMBLIES AND METHOD USING THE DEVICE

CROSS-REFERENCE TO RELATED APPLICATIONS

This application is a National Stage of International patent application PCT/EP2021/068047, filed on Jun. 30, 2021, which claims priority to foreign French patent application No. FR 2006853, filed on Jun. 30, 2020, the disclosures of which are incorporated by reference in their entirety.

FIELD OF THE INVENTION

The invention relates to a device for endorsing screwed assemblies and to a method implementing the device. In a lot of equipment, various mechanical parts are assembled and the assemblies are often held in position by means of screws. The formalization of the proper way of carrying out the assembly operations forms part of the prescribed requirements, notably in the aeronautical and military fields.

BACKGROUND

To manufacture equipment in single units or in small series, the assemblies are produced manually by operators. It is customary to endorse the screwed assemblies by disposing a color mark on each assembly element, whether screw or nut, after verifying the correct placement of the element in question. This color mark is generally realized by means of a colored varnish. The color mark is deposited by an operator dedicated to control or by the operator themselves when trained for self-control. In practice, this type of endorsement cannot be realized for all the assemblies. Notably, it is not acceptable to dispose this type of color mark on the front faces of equipment, for example on a dashboard of an aircraft. In addition, the operation of depositing a color mark requires time for application and drying. This operation is an additional source of human error.

More generally, the endorsement performed by an operator, whether they are the operator who carried out the assembly or a dedicated controller, means that the operator can be morally involved but does not actually offer any guarantee that the assembly operation has been carried out correctly. To demonstrate that the screwed-assembly operation has been carried out correctly, it is necessary to dismount the assembly.

SUMMARY OF THE INVENTION

The invention aims to overcome all or some of the problems mentioned above by proposing means for ensuring that a screwed assembly produced by an operator has been carried out correctly. More specifically, the invention makes it possible to ensure that a threaded assembly element has been placed correctly. Moreover, the invention makes it possible to ensure that the element in the screwed assembly is selected correctly.

To that end, a subject of the invention is a device for producing and endorsing screwed assemblies, comprising a screw gun intended to be handled by an operator, and computer equipment connected to the screw gun, the screw gun being equipped with measurement sensors sending information representative of the torque applied by the screw gun and an angle of rotation applied by the screw gun, the computer equipment storing, in a memory, reference data relating to a screwed assembly to be produced, the computer equipment being configured to compare information representative of the angle and the torque measured during the assembly with the reference data, and to provide a notification as to the conformity of the measurements of the angle and the torque in relation to the reference data, the reference data containing a contact torque associated with a contact angle of multiple turns that is associated with a tolerance, the contact torque and the contact angle corresponding to the end of an assembly phase referred to as approach phase, and a tightening torque associated with a tightening angle, the contact torque being less than the tightening torque of the screwed assembly.

Advantageously, the reference data contain a minimum torque used to initiate the angle measurement of the approach phase, the minimum torque being less than the contact torque.

The device advantageously moreover comprises a first presence detector connected to the computer equipment and disposed in the vicinity of a set of compartments containing various threaded assembly elements, the first presence detector being configured to detect the compartment from which the operator selects one of the threaded assembly elements to produce the assembly, the computer equipment being configured to compare the compartment from which the operator selected the threaded assembly element with a predefined compartment in the memory and to provide a notification as to the conformity of the operator's selection.

The device advantageously moreover comprises a second presence detector which is connected to the computer equipment, is disposed in the vicinity of a space reserved for the production of screwed assemblies, and is configured to detect the positioning of a threaded assembly element in a screwed assembly during production, the computer equipment being configured to compare a positioning carried out by the operator with a predefined positioning in the memory and to provide a notification as to the conformity of the positioning carried out.

The device may be adapted to the production of an assembly implementing multiple threaded assembly elements, with the reference data then advantageously containing an order in which the threaded assembly elements should be mounted, the second presence detector and the computer equipment being configured to detect an order in which the threaded assembly elements are mounted by the operator, in order to compare the order performed by the operator with the predefined order in the reference data and to provide a notification as to the conformity of the order performed by the operator.

The reference data advantageously contain multiple acceptable orders for the mounting of the threaded assembly elements of one and the same assembly, the computer equipment being then configured to provide a notification of conformity if the order performed by the operator corresponds to one of the acceptable orders predefined by the reference data.

Another subject of the invention is a method for producing and endorsing screwed assemblies, said method implementing a device comprising a screw gun intended to be handled by an operator, and computer equipment connected to the screw gun, the screw gun being equipped with measurement sensors sending information representative of the torque applied by the screw gun and an angle of rotation applied by the screw gun, the computer equipment storing, in a memory, reference data relating to a screwed assembly to be produced, the method comprising the following steps:

measuring a contact angle provided that the measured torque is less than or equal to a contact torque, comparing the measured contact angle with a reference contact angle of multiple turns that is associated with a tolerance and contained in the memory as reference datum, providing a notification as to the conformity of the measured contact angle with respect to the reference contact angle, then measuring a tightening angle provided that the measured torque is less than or equal to a tightening torque, comparing the measured tightening angle with a reference tightening angle that is associated with a tolerance and contained in the memory as reference datum, providing a notification as to the conformity of the measured tightening angle with respect to the reference tightening angle, the contact torque being less than or equal to the tightening torque of the screwed assembly.

Advantageously, the method consists in initiating the measurement of the contact angle when the measured torque exceeds a minimum torque less than the contact torque.

The device may moreover comprise a first presence detector connected to the computer equipment and disposed in the vicinity of a set of compartments containing various threaded assembly elements, the method then comprising the following steps:

detecting the compartment from which the operator selects one of the threaded assembly elements to produce the assembly, comparing the compartment from which the operator selected the threaded assembly element with a predefined compartment in the memory (40), and providing a notification as to the conformity of the operator's selection.

The device may moreover comprise a second presence detector which is connected to the computer equipment, is disposed in the vicinity of a space reserved for the production of screwed assemblies, and is configured to detect the positioning of a threaded assembly element in a screwed assembly during production, the method then comprising the following steps:

comparing a positioning carried out by the operator with a predefined positioning in the memory (40), and providing a notification as to the conformity of the positioning carried out.

BRIEF DESCRIPTION OF THE DRAWINGS

The invention will be better understood and other advantages will become apparent from reading the detailed description of one embodiment given by way of example, the description being illustrated by the appended drawing in which.

DETAILED DESCRIPTION

For the sake of clarity, the same elements will bear the same reference signs in the various figures.

Figure 1:
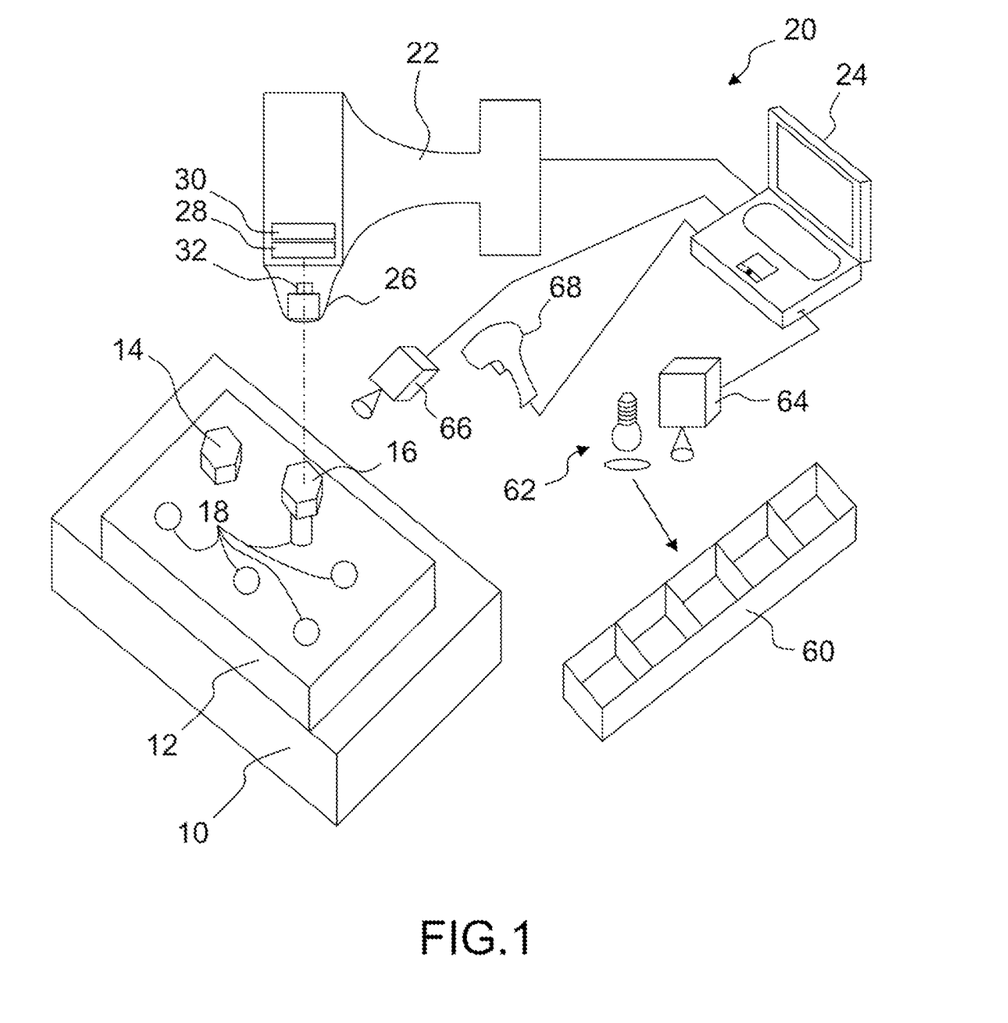
FIG. 1 shows an example of an endorsing device according to the invention.

FIG. 1 shows two mechanical parts 10 and 12 intended to be assembled by means of multiple screws. Of course, the invention may likewise be implemented for any other threaded assembly component, such as a nut, a stud, etc. In the following text, the description will be given with respect to the implementation of screws. It will be easy to apply the invention to other threaded assembly components. In FIG. 1, the two parts 10 and 12 are in the course of being assembled. One screw 14 is already in place and another screw 16 is in the course of being mounted. Drilled holes 18 are made in the part 12 and corresponding tapped threads are made in the part 10. In FIG. 1, the tapped threads are not visible because they are concealed by the part 12 which covers them. The screws 14 and 16 pass freely through the drilled holes 18 in order to be inserted in the tapped threads of the part 10. The assembly is carried out by an operator. More specifically, the operator lays the part 12 on the part 10, in the process making the drilled holes 18 and the tapped threads correspond, and then inserts the screws into the drilled holes and lastly moves on to screwing the screws.

FIG. 1 likewise shows a device 20 for producing and endorsing screwed assemblies. The device 20 comprises a screw gun 22 intended to be handled by the operator and computer equipment 24 connected to the screw gun 22. The connection of the screw gun 22 to the computer equipment 24 can be realized by various means, for example wired means. The connection may also be realized wirelessly, for example by means of a short-range radio link, in order to improve the freedom of movement of the screw gun 22 in relation to the computer equipment 24. The screw gun 22 may have an autonomous power supply, for example in the form of an installed battery. The screw gun 22 is equipped with an endpiece 26 configured to turn the screw 16. The screw gun 22 may be driven by any source of energy, for example electrical or pneumatic, that makes it possible to drive the rotation of the endpiece 26 to provide the screwing.

The screw gun 22 is equipped with sensors sending information representative of the torque applied by the screw gun 22 and an angle of rotation thereof. The two items of information relating to the torque and to the angle may be measured independently. An angle sensor 28 may measure the rotation of the endpiece 26 when the screw 16 is being mounted. To mount the screw 16, the operator places the endpiece 26 over the head of the screw 16 and then handles a switch of the screw gun 22 until the screw 16 is tightened. The rotation of the endpiece 26 may be measured by the sensor 28 as long as the operator holds the switch in the position in which the screw gun 22 drives the endpiece 26. A torque sensor 30 measures the torque applied to the screw 16 by the endpiece 26. The torque measurement is compared with a setpoint torque stored in the memory of the computer equipment 24 and notably makes it possible to verify that a required tightening torque has been reached. This torque is generally reached at the end of the screwing operation, when the screw 16 is tightened. For an electric screw gun 22, the torque is proportional to the current drawn by a motor driving the endpiece 26. Measuring the current therefore makes it possible to find the torque applied by the screw gun. As an alternative to measuring the current, the torque may be measured by other types of sensors. The same applies to the angle sensor. It is possible to find the angular position of the endpiece 26 in relation to the body of the screw gun 22 for example by means of an optical coder or by means of current measurements making it possible to find the position of the rotor in relation to the stator of the electric motor driving the endpiece 26. Subsequently, the terms torque sensor and angle sensor will be used to mean any type of sensor making it possible to send information representative of the torque applied by the screw gun and of the angular position of the endpiece 26 in relation to the body of the screw gun 22, respectively.

As an alternative, the torque and angle measurements may be combined. More specifically, the measurements are taken by jointly measuring the applied torque for various angle values, from the moment the operator starts to handle the switch of the screw gun 22 until the moment the operator releases the switch after tightening the screw 16. The measurements of angles and torques may be taken continuously or by sampling. The combined measurements make it possible to define a curve of the evolution of the torque as a function of the angle through which the endpiece 26 travels while the screw 16 is being driven.

To ensure that the endpiece 26 drives the screw 16 correctly, it is possible to dispose, in the endpiece 26, a contact sensor 32 making it possible to ensure the placement of the endpiece 26 in relation to the screw 16.

The computer equipment 24, via its connection to the screw gun 22, receives information from the various sensors and notably the torque and angle sensors. The computer equipment 24 stores, in a memory, reference data notably relating to the mounting of the screw 16 and of course relating to the mounting of all the screws ensuring the assembly of the mechanical parts 10 and 12. The computer equipment 24 is configured to compare the measurements of angles and torques taken by the sensors 28 and 30 during the assembly with the reference data. The computer equipment 24 is also configured to provide a notification as to the conformity of the measurements in relation to the reference data. This conformity represents the endorsement of the mounting of the screw 16. In the event of non-conformity, the computer equipment 24 can immediately transmit an alarm warning the operator of the non-conformity, in order to enable them to remedy this without delay and before moving on to the mounting of another screw. When all the screws of the assembly of the parts 10 and 12 are mounted, the computer equipment 24 can report on the conformity of the assembly.

Figure 2:
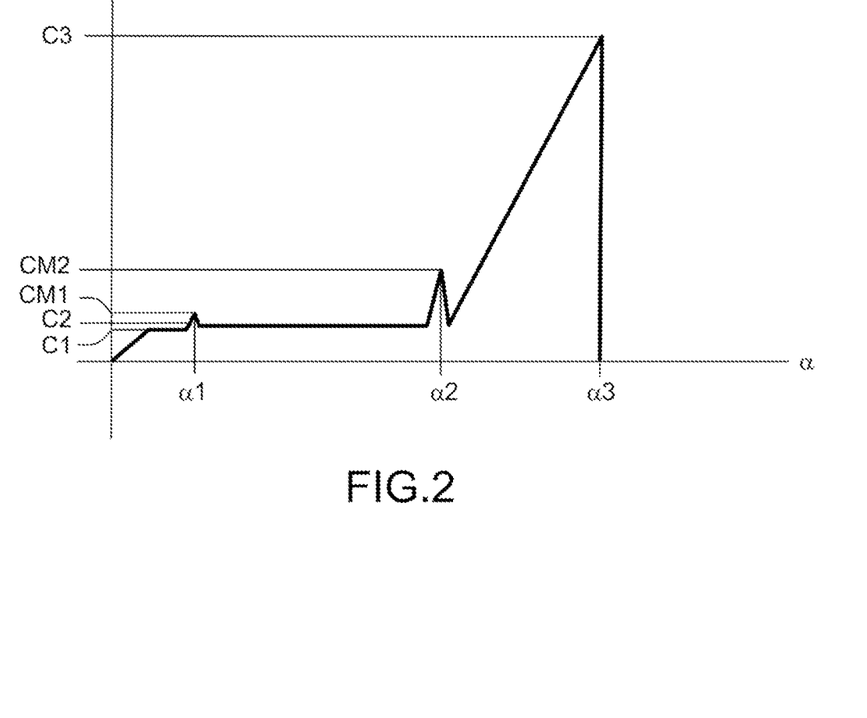
FIG. 2 shows an example of a measurement of the torque applied by a screw gun of a device according to the invention as a function of the angle of rotation of the screw gun when a screw is being mounted.

FIG. 2 shows an example of a curve of the torque applied by the screw gun 22 as a function of its angle of rotation during the operation of screwing the screw 16. The evolution of the torque C as a function of the angle $\alpha$ is shown by a curve 36 obtained when the torque and angle measurements are combined. The starting value of the angle $\alpha$ may be defined by the operator when they trigger the rotation of the screw gun 22 or else when the contact sensor 32 detects the presence of the screw 16. The screwing operation may divided into multiple phases. When the screw gun 22 starts to rotate, the screw gun accelerates and then its speed and its torque stabilize until a torque C1 for an angle $\alpha 1$ is reached. During this first phase, the screw 16 is not yet inserted in the flights of the tapped thread. At the end of this initial phase, the screw 16 enters the tapped thread and turns multiple times therein in a phase referred to as approach phase, without actual tightening. The approach phase ends at the angle $\alpha 2$ when the head of the screw 16 comes into contact with the part 12, possibly via a washer. More generally, the approach phase ends when all the mechanical parts, including the screw, are in contact before the assembly is actually tightened. The approach phase may involve about ten turns, which correspond to the length of thread engaged in the corresponding tapped thread. This length is often selected between 1 and 3 times the nominal diameter of the screw in question. Between the initial phase and the approach phase, the torque applied by the screw gun 22 may slightly increase temporarily, passing through a maximum CM1. This is a parasitic torque due to the alignment of the screw 16 with the axis of the tapped thread. The torque CM1 is sometimes referred to as rectifying torque. During the approach phase, the torque is substantially constant and takes a value C2 on the curve of FIG. 2. During the approach phase, the torque may also increase slightly because of the friction between the screw and its tapped thread, the friction increasing with the number of flights engaged between the screw and the tapped thread. During the approach phase, the screw gun 22 may be servo-controlled to maintain a constant speed. The end of the approach phase is also referred to as: "making contact". Contact being made can be detected by an increase in torque exerted by the screw gun, which appears in FIG. 2 as a maximum CM2. When contact is being made, the various mechanical parts forming the assembly are pressed against one another. The value of the torque exerted by the screw gun upon contact should be sufficient to flatten any elastic washers present in the assembly and to press together the mechanical parts present, even in the event of a flatness fault within acceptable tolerances. At the end of the approach phase, it is possible to stop the screw gun, notably to change it to servo-control mode. To that end, the value of the torque exerted by the screw gun upon contact should not be excessively high, so as to make it possible to restart the screw gun after the approach phase. Typically, the value of the contact torque CM2 may be about 40% of the tightening torque. This value should of course be adapted depending on the type of screw gun implemented and on the various mechanical parts present in the assembly.

At the end of the approach phase, a tightening phase starts that enables the screw to reach the angle $\alpha 3$ corresponding to the tightening torque C3. During the tightening phase, the screw gun may be servo-controlled at the torque C3, for example for an electric screw gun by servo-controlling the current it draws. Between the approach phase and the tightening phase, the change to servo control can cause the driving of the screw gun to stop and the torque visible in FIG. 2 to fall just after the angle $\alpha 2$. During the tightening phase, the torque increases while the screw gun 22 is restarting until it reaches the tightening torque C3. In FIG. 2, the angles are not to scale. In practice, the rotation of the screw gun 22 between the angles $\alpha 1$ and $\alpha 2$ may involve multiple turns, or even about ten turns. The rotation of the screw gun 22 between the angles $\alpha 2$ and $\alpha 3$ may be less than one quarter of a turn.

Figure 3:
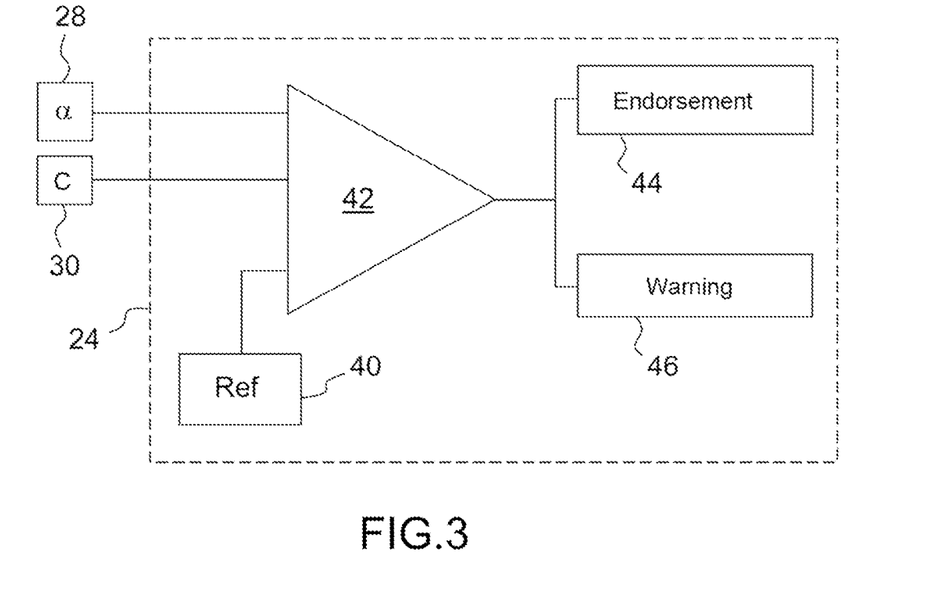
FIG. 3 shows a configuration example of a device according to the invention making it possible to verify the conformity of a screwing operation performed by the screw gun that can be seen in FIG. 2.

FIG. 3 shows the configuration of the computer equipment 24 making it possible to verify the conformity of the mounting of the screw 16. During the screwing operation, the computer equipment 24 receives information representative of angles and torques from the sensors, respectively 28 and 30. The computer equipment 24 comprises a memory 40 containing reference data relating to the screwing operation. More specifically, the reference data contain expected torque and angle values for the mounting of the screw 16. The reference data may contain ranges of values. For example, for the torque C3, a value range of +/−10% can be acceptable. These ranges as a whole form tolerances within which the screwing operation is considered to be correctly performed. These tolerances are defined as a function of multiple parameters, namely the dimensional tolerances and the shape and position tolerances of the parts 10 and 12, the tolerances of the screw 16, and the tolerances relating to the coefficients of friction between the screw 16 and the tapped thread. The computer equipment 24 comprises a comparator 42 configured to compare the measurements from the sensors 28 and 30 to the reference data. The result of the comparison may take two forms 44 and 46: either the values measured are within the prescribed tolerances, the screwing operation is considered to conform, and the digital endorsement 44 is validated; or the values measured are outside the prescribed tolerances, the screwing operation is considered to not conform, and a warning 46 is sent. This warning notifies the operator of the non-conformity. Non-conformity may have multiple causes, such as notably a manufacturing fault of one of the parts 10 or 12 or even of the screw 16. Another cause may be the placement of an incorrect screw. The warning 46 advantageously invites the operator to review the assembly, notably by performing the screw placing and screwing operations again.

As mentioned above, the torque and angle measurements may be taken independently or in combination in order to form the curve of FIG. 2, at least by sampling. When the measurements are taken independently, it is possible for example to take an interest in the tightening torque C3 and the corresponding angle α3. These two measurements are obtained at the end of the screwing operation. When the measurements are taken in combination, it is possible to compare the curve formed by all of the measurements taken with a template present in the reference data. It is thus possible to distinguish the cause of non-conformity more accurately. For example, an excessively small value for the angle α2 may provide a notification that the screw is too short and does not have enough flights engaged in the corresponding tapped thread of the part 10. Conversely, an excessively high value for the angle α2 makes it possible to provide a warning that a screw which is too long has been implemented. An excessively high value for the torque C2 may provide a notification that a screw is poorly engaged in its tapped thread and runs the risk of causing degradation of the tapped thread. More generally, an excessively high coefficient of friction between the screw and the tapped thread, causing an excessively high value for the torque C2, will result in values for the angles α2 and α3 that are too small. In other words, the verification as to the conformity of the approach phase makes it possible to deal with a large number of faults in the various mechanical parts of the screwed assembly.

The conformity of the approach phase may be verified by measuring the angle α2 when the contact torque C2 is reached. In other words, a measurement is taken of the angular displacement of the screw gun 22 from its starting position and provided that the measured torque remains less than a predetermined value, for example equal to 40% of the required tightening torque C3. This predetermined value represents the value C2 shown in FIG. 2. The predetermined value may be defined empirically after multiple tests, notably to take account of a value spread for the torque C2. The predetermined value is greater than the values measured during tests whilst still remaining much lower than the required tightening torque C3. The angular displacement of the screw gun, provided that the measured torque remains less than or equal to C2, should comply with a predetermined angle value to which a tolerance is assigned. This tolerance may depend on the errors it is desired to be able to detect when selecting the parts of the assembly, including when selecting the screw. For example, the ISO metric standardization contains standardized screws of diameter M3 with a length of 6, 8 and 10 mm. The pitch of these screws is 0.5 mm. A screw error, for example a screw which is 6 mm long instead of 8 mm long, leads to a difference of 4 turns in the rotation of the screw gun. If the angular displacement of the screw gun is within a tolerance of +/−720°, that is to say +/−2 turns around an expected value, there is certainty that the screw was selected correctly. It is possible to provide the presence of a washer in the assembly. The measurement of the angular displacement of the screw gun during the approach phase makes it possible to check whether the washer is present or absent. An absent washer will lead to an excessively large angle α2. Here, too, a tolerance relating to the value of the measured angle in relation to the expected value makes it possible to be sure whether the washer is present or absent. The tolerance retained depends on the thickness of the washer.

Other faults can be detected by way of the lack of conformity of the approach phase. For example, an excessively short tapped thread receiving the screw can be detected if the torque C2 is reached at an angle α2 that is too small. This is because the end of the screw will reach the bottom of the tapped thread before the various parts of the assembly make contact and will cause a premature increase in torque.

The start of the approach phase can be defined when the screw gun 22 is set in rotation after the screw has been placed at the entrance to the tapped thread intended to receive the screw. As an alternative, the initial phase can be ignored. The tolerance assigned to the angle α2 may take into account a possible rotation of the screw before it is engaged in the tapped thread. This rotation of the screw is generally less than one turn and can therefore be included in the tolerance example mentioned above, which is +/−2 turns. As an alternative, it is also possible to take the initial phase into account and to initiate the measurement of the angular displacement of the approach phase only at the end of the initial phase, that is to say to measure the difference between the angles α2 and α1 shown in FIG. 2. The angle α1 may be detected by a slight decrease in torque between the torques CM1 and C2. This decrease can be difficult to detect and can even sometimes be absent.

As an alternative, it is possible to define the end of the initial phase more approximately by establishing a minimum torque beyond which the first flight of the screw is considered to be engaged in the tapped thread. This makes it possible notably to avoid taking into account a rotation of the screw gun before the screw comes into contact with the entrance of the tapped thread, this rotation being due to premature startup of the screw gun by the operator. It is possible, for example, to define a minimum torque equal to 10% of the tightening torque. In other words, the angular displacement of the screw gun during the approach phase is measured provided that the torque measured is between 10% and 40% of the required tightening torque. The minimum and maximum torque values between which the angular displacement of the screw gun is taken into account during the approach phase may be defined empirically after multiple tests.

It was seen above that the tolerance relating to the angular displacement of the screw gun during the approach phase could be adapted depending on the presence of auxiliary parts, such as washers. It is likewise possible to enable an operator to adjust this tolerance following measurements of angular displacement without tolerance. Specifically, if a fault is detected, it is possible to provide a procedure that the operator must follow. It is notably possible to request that the operator controls the presence and the dimensions of each part of the assembly more specifically. It may be the case that, by changing the batch when supplying one of the parts of the assembly, certain disparities, such as for example the presence of an entry chamfer at the tapped thread that is larger than a preceding batch, cause apparent non-conformity of the approach phase. By slightly modifying the limits of the tolerance relating to the acceptable angular displacement during the approach phase, it is possible to avoid apparent non-conformity in an assembly which conforms in practice.

FIG. 3 shows the elements of the computer equipment necessary for verifying the conformity of a screwing operation. This screwing operation occurs during a phase of assembling the parts 10 and 12, this phase being described more generally with the aid of FIG. 4. More specifically, the assembly phase starts with an operation 50 of mutually positioning the mechanical parts 10 and 12. Subsequently, the operator selects a first screw, for example the screw 14 making it possible to fix the parts 10 and 12 to one another, during a selection operation 52. Then, the operator carries out an operation 54 of placing the screw 14 into the drilled hole 18 intended to receive it. At the end of the operation 54, the operator carries out the screwing operation 56 using the screw gun 22 as described above. After the operation 56 of screwing the screw 14, the operator repeats the sequence of operations 52, 54 and 56 for other screws, notably the screw 16. This sequence is carried out for all the screws required to assemble the parts 10 and 12.

Figure 4:
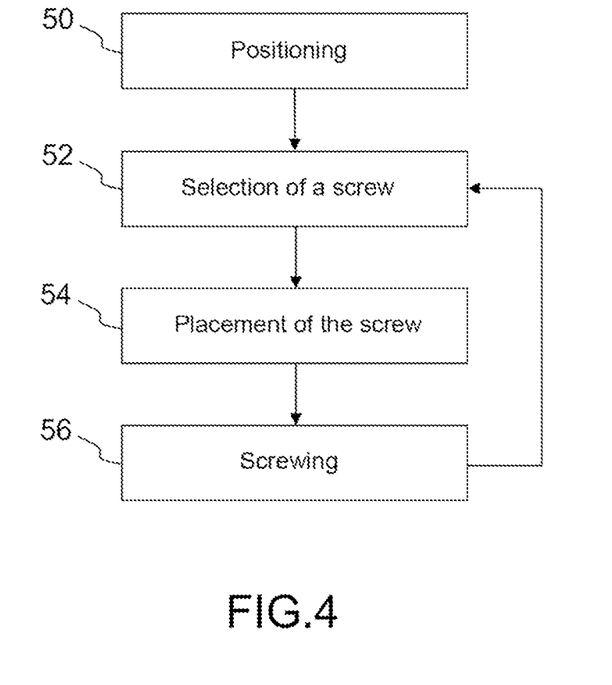
FIG. 4 shows a sequence of operations during a phase of assembling mechanical parts.

The screw selection operation 52 can be a source of error resulting in the non-conformity of the assembly. Advantageously, the device of the invention makes it possible to limit this source of error. Various screws may be stored in a set of compartments 60 provided to that end. It is possible to provide guidance for the operator's selection by indicating to them, for example via suitable lighting means 62, the compartment from which they should take a screw. This illuminated indication does not make it possible to verify that the operator has indeed taken the screw indicated to them. To improve the endorsement as described above that is based on angle and torque measurements, it is possible to ensure the correct selection by means of a presence detector 64 for detecting the presence of the hand of the operator in the designated compartment. The detector 64 may be an optical detector disposed facing the entire set of compartments 60. The optical detector may likewise be based on the interruption of a light beam when the hand enters the correct compartment and provide a warning if the hand enters an incorrect compartment. As an alternative, the presence detector 64 may be based on other physical principles, such as for example the detection of an electrical micro-current passing through the hand of the operator by connecting the compartment to earth. The presence detector 64 is connected to the computer equipment 24 so as to send it information relating to the selection made by the operator. The endorsement 44 is then validated when the operator's selection is correct and when the measurements from the sensors 28 and 30 conform to the expected reference data.

In the same way, it is possible to verify that the screw selected by the operator is placed at the correct location by means of a presence detector 66 disposed in the vicinity of a space reserved for the production of the assembly. The presence detector 66 is likewise connected to the computer equipment 24 so as to send it information relating to the insertion of the screw in the correct drilled hole in the part 12. The endorsement 44 is then validated when the screw selected by the operator is disposed at the correct location and when the measurements from the sensors 28 and 30 conform to the expected reference data. This additional endorsement condition advantageously supplements that relating to the correct selection of the screw by the operator.

In order to correctly initialize the phase of assembling the parts 10 and 12 for the computer equipment 24, it is possible to provide that the operator enters data, making it possible to identify the assembly phase that they will carry out. This data entry may be done by means of a keyboard of the computer equipment 24 or by an external reader 68 connected to the computer equipment 24. The reader may for example be a barcode reader making it possible to read a label affixed to each of the parts 10 and 12 or to documents accompanying them. In this way, it is easy to associate reference data with the assembly phase in process and then to associate, where appropriate, the endorsement with the assembly phase carried out.

The device 20 may likewise make it possible to assist the operator and to endorse the order in which multiple screws of one assembly are mounted. The order may be of interest when multiple screws ensure the fixing of the mechanical parts of the assembly. Mounting the screws in an incorrect order can cause the mechanical parts to deform. For example, when the mechanical parts form a duct in which a fluid is intended to flow, for example during the assembly of two flanges each forming the end of a tube, mounting the screws in an incorrect order can result in leaks at the contact surface between the flanges, even when a seal is present. It is impossible to verify that a specific order has been correctly followed by the operator on the basis of the fixed mechanical parts once all the screws are tightened. Evidence of the order could consist in a video recording of the mounting of all the screws of the assembly. However, such a video requires significant control time. It is necessary to replay the scene fully to verify that the screws have been mounted in the correct order. The invention makes it possible to endorse the assembly upon completion of the mounting of the various screws. A warning can be sent either when the assembly is completed or directly as soon as a screw is positioned at an incorrect location in order that the operator can correct the location immediately. To that end, the presence detector 66 can be implemented to locate the various screws that have been mounted and to send this information to the computer equipment 24. Said computer equipment, in turn, compares the order in which the operator mounted the various screws with a predefined order. As indicated above, a difference between the order carried out by the operator and the predefined order results in the computer equipment 24 sending a warning. By contrast, if there is no difference, the digital endorsement is given.

Figure 5A:
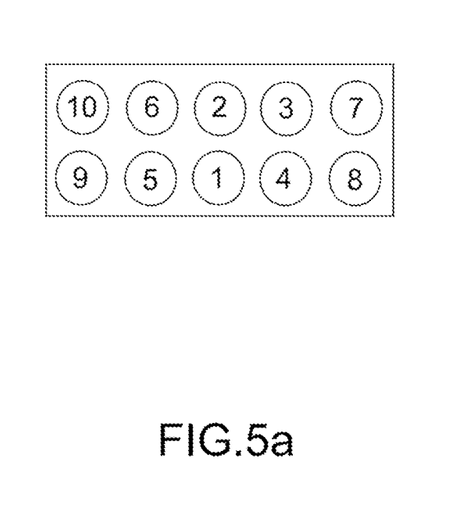
FIGS. 5a and 5b show two examples of a desirable order for two screwed assemblies.
Figure 5B:
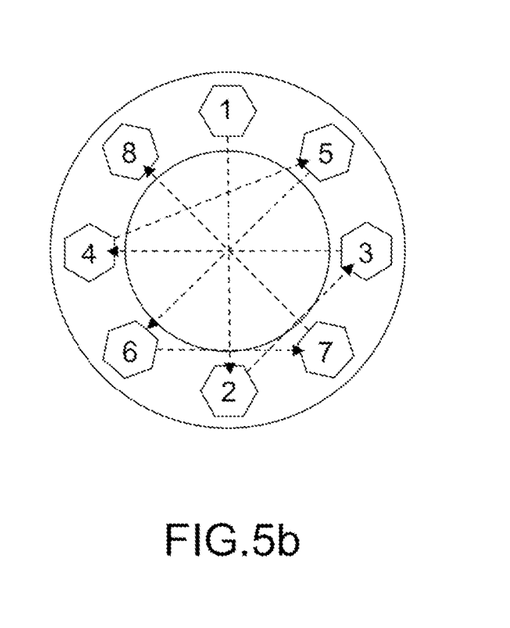

FIGS. 5a and 5b show two examples of a desirable order for two screwed assemblies. FIG. 5a shows an assembly in which the positions of the screws form a rectangle in a plane intersecting the axes of the screws. FIG. 5b shows an assembly in which the positions of the screws form a circle. Of course, the assistance provided to the operator and the endorsement by means of a device according to the invention may be performed for any shape in which the position of the screws can be inscribed. In each of the examples, a correct mounting order is specified: from 1 to 10 in FIG. 5a, and from 1 to 8 in FIG. 5b.

In FIG. 5a, the first screw is located in the center and at the bottom, the second screw is located in the center and at the top, the third screw is located to the right of the second, and so on. The sequence shown is well suited to a right-handed operator: after the second screw, the operator positions a third screw to the right. A left-handed operator will be more comfortable positioning the third screw to the left of the second screw, and so on. In other words, multiple correct orders can be admissible, with it being possible for the various admissible orders to be deduced by symmetry about the vertical axis and also about the horizontal axis if the operator places their first screw at the top and not at the bottom as shown. The same applies for the acceptable sequences in the sequence variant proposed in FIG. 5b. After the two first screws, the third may be to the right, as shown, or alternatively to the left. The following up of the sequence is also deduced by symmetry about an axis passing through the positions of the two first screws. In addition, in the example of FIG. 5b, the operator can start with any screw. The second screw should be diametrically opposite.

In a multiple-screw assembly produced in a fully automated manner without the intervention of an operator, it is possible to prescribe a specific order for the mounting of the various screws. By contrast, when an operator handles a screw gun, it is preferable to make it possible to endorse multiple acceptable orders deduced from one another by symmetry or circular permutation.

The invention claimed is:

1. A device for producing and endorsing screwed assemblies, comprising a screw gun intended to be handled by an operator, and computer equipment connected to the screw gun, the screw gun being equipped with measurement sensors sending information representative of the torque applied by the screw gun and an angle of rotation applied by the screw gun, the computer equipment storing, in a memory, reference data relating to a screwed assembly to be produced, the computer equipment being configured to compare information representative of the angle and the torque measured during the assembly with the reference data, and to provide a notification as to the conformity of the measurements of the angle and the torque in relation to the reference data, the reference data containing a contact torque associated with a contact angle of multiple turns that is associated with a tolerance, the contact torque and the contact angle corresponding to the end of an assembly phase referred to as approach phase, and a tightening torque associated with a tightening angle, the contact torque being less than the tightening torque of the screwed assembly.

2. The device as claimed in claim 1, wherein the reference data contain a minimum torque used to initiate the angle measurement of the approach phase, the minimum torque being less than the contact torque.

3. The device as claimed in claim 1, moreover comprising a presence detector connected to the computer equipment and disposed in the vicinity of a set of compartments containing various threaded assembly elements, the presence detector being configured to detect the compartment from which the operator selects one of the threaded assembly elements to produce the assembly, the computer equipment being configured to compare the compartment from which the operator selected the threaded assembly element with a predefined compartment in the memory and to provide a notification as to the conformity of the operator's selection.

4. The device as claimed in claim 1, moreover comprising a presence detector which is connected to the computer equipment, is disposed in the vicinity of a space reserved for the production of screwed assemblies, and is configured to detect the positioning of a threaded assembly element in a screwed assembly during production, the computer equipment being configured to compare a positioning carried out by the operator with a predefined positioning in the memory and to provide a notification as to the conformity of the positioning carried out.

5. The device as claimed in claim 4, adapted to the production of an assembly implementing multiple threaded assembly elements, wherein the reference data contain an order wherein the threaded assembly elements should be mounted, wherein the presence detector disposed in the vicinity of the space reserved for the production of screwed assemblies and the computer equipment are configured to detect an order wherein the threaded assembly elements are mounted by the operator, wherein the computer equipment is configured to compare the order performed by the operator with the predefined order in the reference data, and wherein the computer equipment is configured to provide a notification as to the conformity of the order performed by the operator.

6. The device as claimed in claim 5, wherein the reference data contain multiple acceptable orders for the mounting of the threaded assembly elements of one and the same assembly, the computer equipment being configured to provide a notification of conformity if the order performed by the operator corresponds to one of the acceptable orders predefined by the reference data.

7. A method for producing and endorsing screwed assemblies, said method implementing a device comprising a screw gun intended to be handled by an operator, and computer equipment connected to the screw gun, the screw gun being equipped with measurement sensors sending information representative of the torque applied by the screw gun and an angle of rotation applied by the screw gun, the computer equipment storing, in a memory, reference data relating to a screwed assembly to be produced, the method comprising the following steps:

measuring a contact angle provided that the measured torque is less than or equal to a contact torque, comparing the measured contact angle with a reference contact angle of multiple turns that is associated with a tolerance and contained in the memory as reference datum, providing a notification as to the conformity of the measured contact angle with respect to the reference contact angle, then measuring a tightening angle provided that the measured torque is less than or equal to a tightening torque, comparing the measured tightening angle with a reference tightening angle that is associated with a tolerance and contained in the memory as reference datum, providing a notification as to the conformity of the measured tightening angle with respect to the reference tightening angle, the contact torque being less than or equal to the tightening torque of the screwed assembly.

8. The method as claimed in claim 7, consisting in initiating the measurement of the contact angle when the measured torque exceeds a minimum torque less than the contact torque.

9. The method as claimed in claim 7, wherein the device moreover comprises a first presence detector connected to the computer equipment and disposed in the vicinity of a set of compartments containing various threaded assembly elements, the method comprising the following steps:

detecting the compartment from which the operator selects one of the threaded assembly elements to produce the assembly, comparing the compartment from which the operator selected the threaded assembly element with a predefined compartment in the memory, and providing a notification as to the conformity of the operator's selection.

10. The method as claimed in claim 9, wherein the device moreover comprises a second presence detector which is connected to the computer equipment, is disposed in the vicinity of a space reserved for the production of screwed assemblies, and is configured to detect the positioning of a threaded assembly element in a screwed assembly during production, the method comprising the following steps:

comparing a positioning carried out by the operator with a predefined positioning in the memory, and providing a notification as to the conformity of the positioning carried out.

* * * * *